US007004023B2

(12) United States Patent
Merrild

(10) Patent No.: US 7,004,023 B2
(45) Date of Patent: Feb. 28, 2006

(54) METHOD AND A SYSTEM FOR LEVEL MEASUREMENT OF A LIQUID IN CONTAINERS

(75) Inventor: Frans Merrild, Copenhagen K (DK)

(73) Assignee: Tell It Online APS, Hellerup (DK)

(*) Notice: Subject to any disclaimer, the term of this patent is extended or adjusted under 35 U.S.C. 154(b) by 0 days.

(21) Appl. No.: 10/513,915

(22) PCT Filed: May 6, 2003

(86) PCT No.: PCT/DK03/00299

§ 371 (c)(1),
(2), (4) Date: Nov. 10, 2004

(87) PCT Pub. No.: WO03/095953

PCT Pub. Date: Nov. 20, 2003

(65) Prior Publication Data

US 2005/0120792 A1 Jun. 9, 2005

(30) Foreign Application Priority Data

May 10, 2002 (DK) .............................. 2002 00718

(51) Int. Cl.
*G01F 23/14* (2006.01)

(52) U.S. Cl. ........................................................ 73/303

(58) Field of Classification Search .................. 73/299, 73/301, 302, 303

See application file for complete search history.

(56) References Cited

U.S. PATENT DOCUMENTS

| | | | | |
|---|---|---|---|---|
| 4,587,535 A * | 5/1986 | Watanabe | .................... | 347/23 |
| 5,095,739 A | 3/1992 | Hedtke | | |
| 5,347,863 A * | 9/1994 | Richard | ........................ | 73/301 |
| 5,379,638 A | 1/1995 | Denz et al. | | |

* cited by examiner

*Primary Examiner*—Hezron Williams
*Assistant Examiner*—Paul M. West
(74) *Attorney, Agent, or Firm*—Iver P. Cooper

(57) ABSTRACT

The present invention is concerned with a method and a system for hydrostatic level readings of liquids in a container comprising the steps of providing a pressure sensor capable of determining a pressure value in a suction pipe, correlating said result to a predetermined liquid level value, and thereby obtaining a reading result of the level of the liquid in said container. The invention further discloses the use of the method and system for example for monitoring a heat system, for the petrochemical industry, for petrol containers in cars, for tank trucks and for Jacuzzis.

20 Claims, 4 Drawing Sheets

System set-up

Pressure behaviour

1) Heater
2) Burner
3) Control unit
4) Suction pipe
5) T-piece sensor
6) 230 V
7) Oil tank

System set-up

Compensation of none linear sensor output:

METHOD AND A SYSTEM FOR LEVEL MEASUREMENT OF A LIQUID IN CONTAINERS

FIELD OF INVENTION

The present invention relates to a method for hydrostatic level readings of a liquid in a container, wherein said method comprises software applications.

BACKGROUND OF INVENTION

The hydrostatic principle is well known in the prior art. An example of the hydrostatic principle is in a liquid container provided with an outlet in the form of a suction pipe. In situations where there is no outtake from the container the liquid in the suction pipe will either run back into the container and thereby create a vacuum for containers placed underground, or the pressure will be equal to the pressure inside the container for containers placed above ground. The relationship between vacuum/pressure and liquid level in the container is linear. So in an underground container the vacuum in the suction pipe will increase as the liquid level in the container decreases. At the same token the pressure in a container will increase as the liquid level in the container increases.

JP 59-023750 (abstract only) describes the measurement of the liquid level in an underground tank. Here the measurement of a product level of a liquid is performed when there is no outtake from the container. This means that an apparatus is measuring the level of liquid in periods when the suction pump is not running by measuring directly on the pump and/or flow meter and/or control unit for these entities.

Conventional level reading techniques provide the problem of being time consuming to install and needing skilled fitters to carry out the installation. Thus, conventional level reading techniques are very expensive to use for the world market.

The present invention provides for the liquid level of a container to be determined in a cost efficient and time reducing manner by disclosing a level reading installation using the hydrostatic principle having less complicated hardware and being capable of installation without expert knowledge of areas, such as heat burners or the hydrostatic principle.

SUMMARY OF INVENTION

The present invention thus relates to a method for hydrostatic level readings of liquids in a container comprising the steps of a) providing a pressure sensor capable of determining a pressure value in a suction pipe, wherein said pipe is connecting said container to an outlet, by determining a plurality of pressure values in the suction pipe during at least one cycle of suction and non-suction of the pipe, said at least one pressure value being determined during suction and at least one pressure value being determined during non-suction, and thereby b) determining a lowest pressure value and a highest pressure value in the suction pipe during the at least one cycle, c) subtracting the lowest pressure value from the highest pressure value, obtaining a subtraction result, d) correlating said result to a predetermined liquid level value, and thereby e) obtaining a reading result of the level of the liquid in said container.

System

In another aspect the present invention concerns a system for hydrostatic level readings of liquids in a container comprising f) a pressure sensor capable of determining a pressure value in a suction pipe, wherein said pipe is connecting said container to an outlet, by determining a plurality of pressure values in the suction pipe during at least one cycle of suction and non-suction of the pipe, said plurality of pressure values being determined both during suction and non-suction, and g) means for determining a lowest pressure value and a highest pressure value in the suction pipe during the at least one cycle, h) means for subtracting the lowest pressure value from the highest pressure value, i) means for correlating said result to a predetermined liquid level value, and thereby j) means for presenting a reading result of the level of the liquid in said container, In yet a further aspect the present invention discloses the use of a method for monitoring a heat system and thereby controlling heating of buildings.

It is also within the scope of the present invention to use said method for applications, such as for the petrochemical industry, petrol containers in cars, tank trucks, and for jacuzzis.

By combining the sensor with a microprocessor, and recalibrate the output signal against a known output from a linear sensor, it is possible to reduce the none-linearity to ±/−0,1 mm. In a calibration bench, the sensor is pressurised in different intervals from 0 to 350 mBar, and the output is compared with and already compensated sensor. The necessary corrections are then downloaded into the microprocessor. Furthermore, by adding a temperature sensor on the board as well, the microprocessor is able to compensate for the temperature drift in of the sensor.

Figure 2:
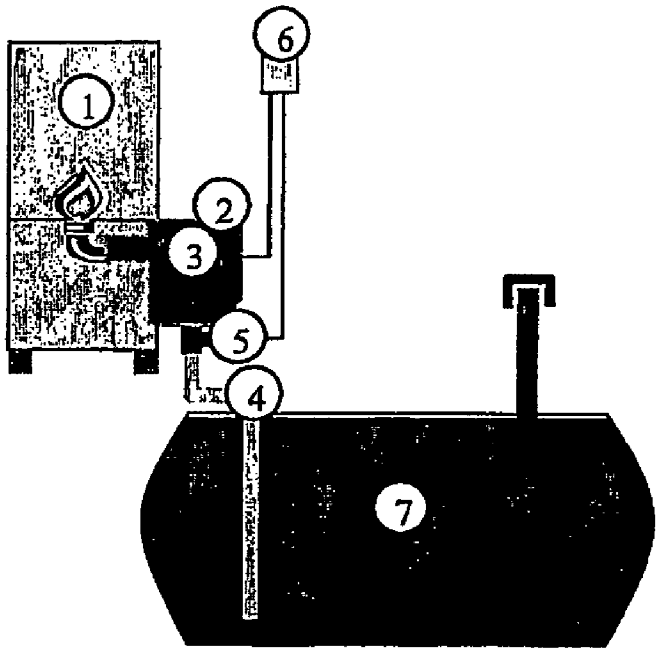
FIG. 2 shows one embodiment of the invention, wherein a T-piece, with a build in pressure sensor and a processor (T-piece sensor) is mounted between the suction pipe of an underground container and the burner, and connected to the power supply of the burner. As it shows, the T-piece sensor it mounted between the end of the suction pipe (4) from the oil tank (7) and the burner (2), and powered from the same power supply (6) as the burner. No connection is made to the control unit (3) in order to measure whether or not the burner is running; the processor in the T-piece sensor (5) does this directly. The communication from the T-piece sensor to the system users is either via a cable or wireless.
Figure 3:
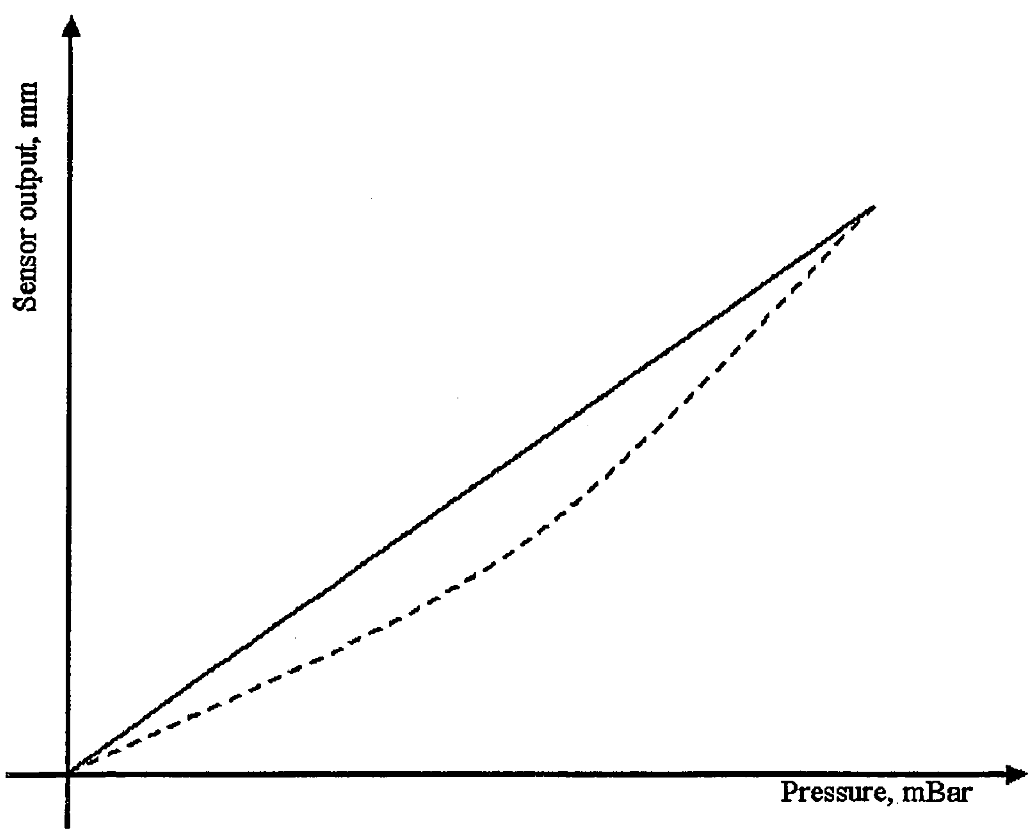
FIG. 3 shows that the output of a sensor is not 100% linear (the dashed line), and the none-linearity varies from one sensor to another. The output signal might be 0–200 mW, where 0 equals 0 mBar and 200 equals 350 mBar, which for water equals 0–350 cm. Maximum error of standard sensors is normally 1% of full scale output (350 mBar), which equals +/−3,5 cm. Furthermore, the output is drifting depending on the temperature in which the sensor is working.
Figure 4:
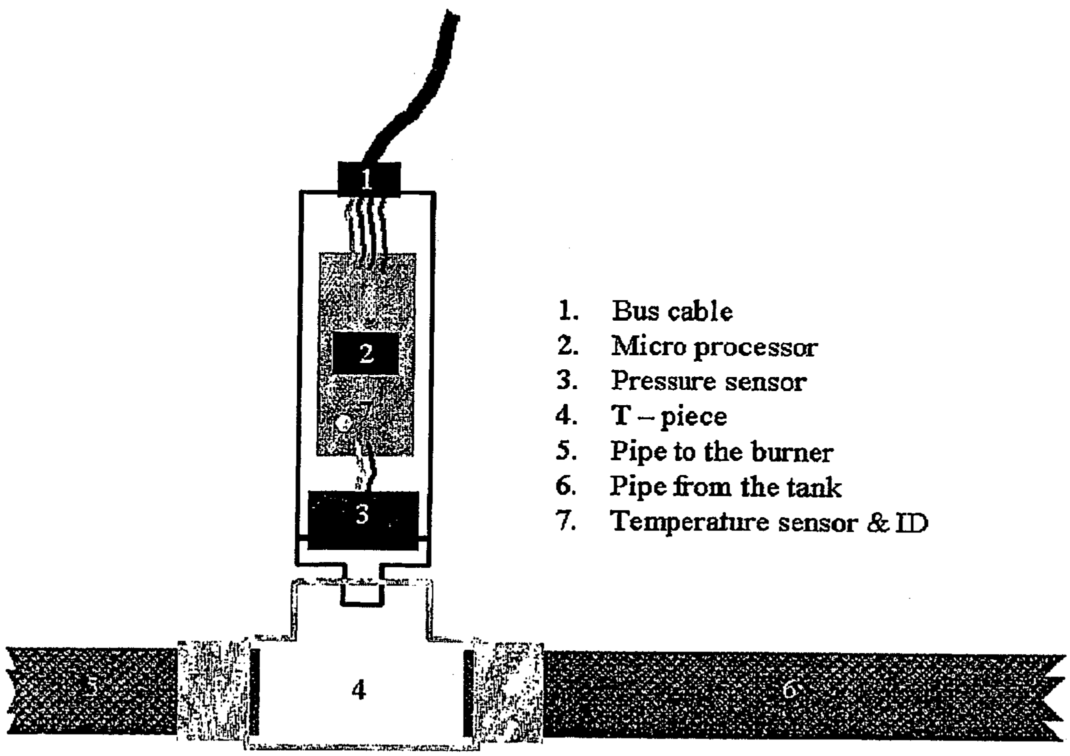

FIG. 4 shows a close up of the T-piece of FIG. 2.

DETAILED DESCRIPTION OF THE INVENTION

The present invention is preferably using computer microprocessor devices storing algorithms in combination with the hydrostatic principle. The system of the invention analyses the pressure in the suction pipe, preferably with predetermined time intervals and based on knowledge of known behaviour, it is possible to determine the liquid level in the container.

The basic principle behind the present invention is that every time the oil-burner starts the pressure/vacuum gradually increases, and when the oil-burner stops the pressure immediately decreases to the starting level. By analysing the pattern or pressure values, it is possible to determine the highest pressure value and the lowest pressure value, wherefrom the product level in a container may be determined and subsequently the amount of liquid being used may be determined. The determination of the highest and the lowest pressure values may be conducted by any suitable means. For example each pressure value may be read out to a printer followed by the user's determination of the highest and lowest pressure values and subsequent subtraction. In a preferred embodiment the determination of the highest and lowest pressure values and the subsequent subtraction is carried out in a computer microprocessor device connected to the sensor, wherein computations are carried out, such as a computer microprocessor device. Each pressure value is read into the computer microprocessor device and processed therein. By determining the relevant pressure values directly from the pressure value pattern, the need to correlate pressure values to pump function, i.e. whether the pump is on or off becomes superfluous.

Accordingly, it is no longer necessary to physically measure the outtake from a container since the connection to any pumps or flow meter or control unit for such entities has been made superfluous by the present invention.

Thus, the present invention concerns a method for hydrostatic level readings of liquids in a container comprising the steps of

- providing a pressure sensor capable of determining a pressure value in a suction pipe, wherein said pipe is connecting said container to an outlet, by determining a plurality of pressure values in the suction pipe during at least one cycle of suction and non-suction of the pipe, said plurality of pressure values being determined both during suction and at least one pressure value being determined during non-suction, and thereby
- determining a lowest pressure value and a highest pressure value in the suction pipe during the at least one cycle,
- subtracting the lowest pressure value from the highest pressure value,
- correlating said result to a predetermined liquid level value, and thereby
- obtaining a reading result of the level of the liquid in said container,

Pressure Values

Figure 1:
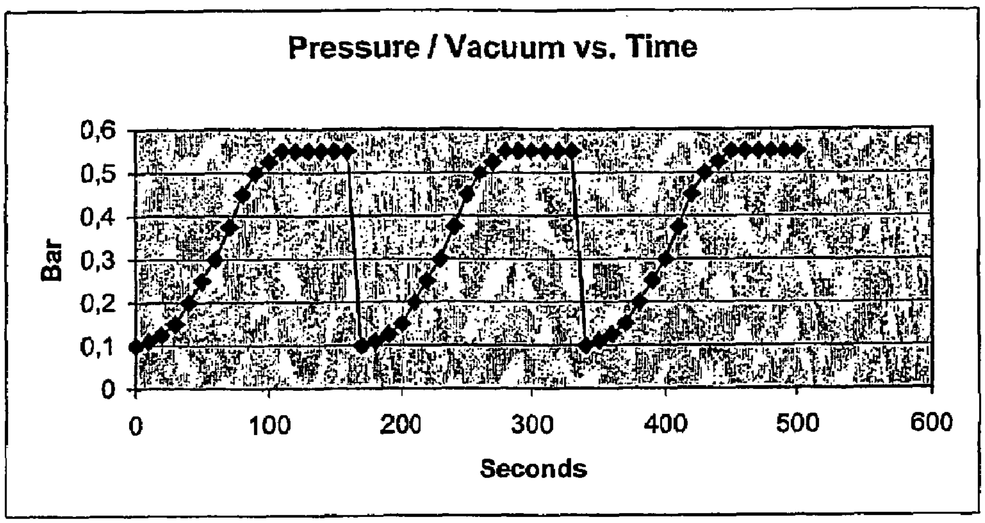
FIG. 1 shows the pressure behaviour of liquid in a container determined according to the invention.

By the term "pressure value" is meant the value read out from the sensor. In one embodiment of the invention the determination of a plurality of pressure values is performed continuously. By "continuously" is meant that the time frame between one individual determination of a pressure value using software of the invention and a second individual determination of a pressure value is identical to the time frame between the second individual determination of a pressure value and a third individual determination of a pressure value. Each pressure value is read out from the sensor, preferably to a computer microprocessor device an example of the pattern of pressure values determined during these cycles is shown in FIG. 1, wherein each diamond (♦) represents a pressure value. For each cycle the highest (0.55 bar) and lowest (0.1 bar) pressure value is determined as discussed above from the pattern, and subsequently the two values are subtracted obtaining a subtraction result, in this example numerically being 0.45 bar.

The subtraction result is corrected to a predetermined liquid level value of said container, and a reading result of the present liquid level is obtained from the correlation. In case the correlation is conducted in a computer microprocessor device the reading result may be read out from the computer microprocessor device by a display and/or printer connected to the computer microprocessor device. In one embodiment the predetermined liquid level value is conducted by measuring the liquid level when the container is full, for example by use of a metering device and simultaneously registering the subtraction result. Based on the information the correlation may be conducted for each subtraction result.

In another embodiment the determination of a plurality of pressure values is performed discontinuously. By "discontinuously" is meant that the determinations of the pressure values are not performed within predefined time intervals, or having predefined time intervals between the individual determinations. In one embodiment "discontinuously" means at random.

In another embodiment the point in time for determining the next pressure values is dependent on the present previously obtained pressure values.

Thus, in one embodiment the difference between the latter two pressure values settles when the system should determine the next pressure value. For example a decreasing and/or increasing trend in pressure value "triggers" the onset of a new pressure value with a smaller time frame than a difference which is substantially zero.

Time Period Between Determinations

In one aspect of the invention the time period between the determination of a first pressure value and the determination of a second pressure value is done continuously, as determined by for example the user. In one embodiment the predetermine time period is entered into the system which is also capable of conducting the steps of: determining the pressure value, subtracting the values, and correlating the values. Such system may for example be relevant software connected to the pressure sensor.

The time interval between one such first determination and one such second determination may in one embodiment be substantially less than 1.0 second, such as less than 0.5 second, for example less than 0.1 second, such as less than 0.05 second for example less than 0.01 second. In another embodiment the time interval may be substantially less than 10.0 seconds, such as less than 5.0 seconds. In yet another embodiment the time interval may be substantially less than 60.0 seconds, such as less than 30.0 seconds, for example less than 20.0 seconds. In yet a further embodiment the time interval may be substantially less than 120.0 seconds, such as less than 100.0 seconds, for example less than 80.0 seconds.

In another aspect of the invention the time period between the determination of the first pressure value and the determination of the second value is within one cycle of the suction pipe. By "cycle of the suction pipe" is meant the time it takes from the onset (resting pressure value) of the increase in pressure, for example when liquid is pumped out of the container to the time when the pressure value is back at the resting pressure value. (FIG. 1 depicts such "suction" cycles).

The outlet of the present container may in one embodiment be capable of attracting the liquid from the suction pipe through the means of pumping, and in another embodiment the outlet is capable of attracting the liquid from the suction pipe through the means of combustion.

Placing Container

According to the invention the container may in one embodiment be placed underground. In a second embodiment the container may be placed over ground.

Independent from the above the outlet of the present container may be placed underground, or it may be placed over ground.

Tank

The container of the invention may be a tank, for example a tank for containing oil.

Liquid

The liquid which level is determined according to the invention may be any liquid in a container, such as oil, gasoline, water, hot and cold beverages, such as beer, wine, soft drinks, coffee, tea, chocolate, milk and liquid food items, such as feeding stuff and soup.

Sensor

In one embodiment of the invention the pressure sensor is a differential transmitter. In a preferred embodiment the pressure sensor is a T-piece sensor, where analogue signals may be converted into digital signals by the computer microprocessor device.

In a preferred embodiment any temperature drift and non-linearity of the sensor that could lead to lesser precision may be compensated for by the present invention. This provides more precise determinations of the pressure values. For example the compensation, of the differential transmitters none linearity, is done prior to the installation by adjusting the digital output to a known output from a master sensor. Hereby, the worst-case scenario shows that the precision is improved from +/−10 mm to +/−1 mm. Upon installation; the measured product level may be adjusted according to the actual product level in the tank—this is done via an external device, for example a dip stick reading.

Use

The present method and system may be used for any liquid level measurements in containers wherein the liquid is consumed by means of a pump, combustion or the like creating a pressure difference in the outlet of the container. The invention may thus be used for reporting the actual level of liquid in the tank as well as the amount of liquid consumed by subtracting the actual liquid level from the initial liquid level, knowing the relevant parameters of the container. Thereby, the method and system according to the invention may be provided with an alarm in situations where such an alarm is needed. This could for example be the case in circumstances where the container is a tank in a heating system containing oil and the knowledge of the level of oil is important for the success of the continuous heating of a building.

Accordingly, the method and system of the invention may be used for monitoring a heat system and thereby controlling heating of buildings, time for refill and when the tank is empty.

In another aspect the present method may be used for the petrochemical industry, such as in tanks of petrol for example at petrol stations, thereby monitoring when the tanks are empty and when it is time for a refill.

A further use of the present method is for petrol containers in cars, such as a private car.

The present invention may also be used for determining the liquid level in tank trucks.

In yet a further embodiment the liquid level determination method is used for jacuzzis.

EXAMPLES

In one embodiment of the invention a system as shown in FIG. 2 is arranged. Control unit (3) is a device having incorporated therein software capable of conducting the steps b)–e) of the method according to the invention.

1. Converts the analogue signals from the sensor into digital readings
2. Stores the current lowest and highest readings, and time of occurrence
3. Calculates the actual product level in the tank by subtracting the lowest from the highest reading. The higher the difference, the more is in the tank
4. Compensate for temperature drift and the none linearity of the sensor
5. Stores the levels at predefined times There is no predefined unit of time between the analyses of the sensor output programmed into the data processor or any input from sensors of whether or not there is an outtake from the tank; the readings are done on the fly via the intelligence of the software. The basis is that every time the oil-burner starts the pressure/vacuum gradually increases, and when the oil-burner stops the pressure immediately decreases to the starting level. By analysing this pattern the software is able both to determine the product level in the tank and to determine how much is used.

What is claimed is:

1. A method for hydrostatic level readings of liquids in a container comprising the steps of providing a pressure sensor capable of determining a pressure value in a suction pipe, wherein said pipe is connecting said container to an outlet, by determining a plurality of pressure values in the suction pipe during at least one cycle of suction and non-suction of the pipe, said plurality of pressure values being determined both during suction and non-suction, and thereby determining a lowest pressure value and a highest pressure value in the suction pipe during the at least one cycle, subtracting the lowest pressure value from the highest pressure value, correlating said result to a predetermined liquid level value, and thereby obtaining a reading result of the level of the liquid in said container.

2. The method according to claim 1, wherein said determination of a plurality of pressure values is performed continuously.

3. The method according to claim 1, wherein the point in time for determining the pressure values is dependent on the values of said pressures.

4. The method according to claim 1, wherein the determination of a plurality of pressure values is performed discontinuously.

5. The method according to claim 1, wherein the time period between the determination of the first pressure value and the determination of the second value is within one cycle of the suction pipe.

6. The method according to claim 1, wherein the liquid is oil.

7. The method according to claim 1, wherein the liquid is gasoline.

8. The method according to claim 1, wherein the pressure sensor is a differential transmitter.

9. The method according to claim 1, wherein the pressure sensor is a T-piece sensor.

10. The method according to claim 1, wherein the outlet is capable of attracting the liquid from the suction pipe through means of pumping.

11. The method according to claim 1, wherein the result of the level of the liquid initiates an alarm.

12. A system for hydrostatic level readings of liquids in a container comprising a pressure sensor capable of determining a pressure value in a suction pipe, wherein said pipe is connecting said container to an outlet, by determining a plurality of pressure values in the suction pipe during at least one cycle of suction and non-suction of the pipe, said plurality of pressure values being determined both during suction and non-suction, and means for determining a lowest pressure value and a highest pressure value in the suction pipe during the at least one cycle, means for subtracting the lowest pressure value from the highest pressure value, means for correlating said result to a predetermined liquid level value, and thereby means for presenting a reading result of the level of the liquid in said container.

13. The system according to claim 12, wherein said determination of a plurality of pressure values is performed continuously.

14. The system according to claim 12, wherein the point in time for determining the pressure values is dependent on the values of said pressures.

15. The system according to claim 12, wherein the determination of a plurality of pressure values is performed discontinuously.

16. The system according to claim 12, wherein the means for determining highest and lowest pressure values, subtracting and/or correlating is a computer.

17. The system according to claim 12, wherein the pressure sensor is a differential transmitter.

18. The system according to claim 12, wherein the pressure sensor is a T-piece sensor.

19. The system according to claim 12, wherein the outlet is capable of attracting the liquid from the suction pipe through means of pumping.

20. The system according to claim 12, further comprising an alarm.

* * * * *